US011153777B2

(12) United States Patent
Heo et al.

(10) Patent No.: US 11,153,777 B2
(45) Date of Patent: Oct. 19, 2021

(54) APPARATUS AND METHOD FOR ADJUSTING NETWORK PARAMETER

(71) Applicant: Samsung Electronics Co., Ltd., Suwon-si (KR)

(72) Inventors: Joonyoung Heo, Suwon-si (KR); Jinmo Sung, Suwon-si (KR); Mooyoung Kim, Suwon-si (KR); Minjung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 24 days.

(21) Appl. No.: 16/503,133

(22) Filed: Jul. 3, 2019

(65) Prior Publication Data
US 2020/0015115 A1 Jan. 9, 2020

(30) Foreign Application Priority Data
Jul. 3, 2018 (KR) .................. 10-2018-0077228

(51) Int. Cl.
*H04W 28/02* (2009.01)
*G06F 9/4401* (2018.01)
(Continued)

(52) U.S. Cl.
CPC ...... *H04W 28/0268* (2013.01); *G06F 9/4406* (2013.01); *H04L 69/162* (2013.01); *H04L 69/165* (2013.01); *H04W 4/70* (2018.02)

(58) Field of Classification Search
CPC .............................. H04W 28/0268
See application file for complete search history.

(56) References Cited

U.S. PATENT DOCUMENTS

2010/0095101 A1* 4/2010 Derdak ............... G06F 11/0709
712/228
2016/0301631 A1* 10/2016 Yu ....................... H04L 47/2483
(Continued)

FOREIGN PATENT DOCUMENTS

WO 2017/172789 A1 10/2017
WO WO-2017172789 A1 * 10/2017 ............ H04W 72/10

OTHER PUBLICATIONS

ZTE, "Remaining evaluation methodology and assumptions for NOMA", 3GPP TSG RAN WG1 Meeting #93, May 21-25, 2018, R1-1805843, 13 pages.
(Continued)

*Primary Examiner* — Ayanah S George

(57) ABSTRACT

An electronic device includes a wireless communication modem; a processor; a volatile memory configured to be operatively connected to the processor; and a non-volatile memory configured to store at least one application program and to be operatively connected to the processor. The non-volatile memory may be configured to store, when executed, instructions that cause the processor to transmit and receive first data packets to and from the communication modem and to provide a network device interface including at least one first parameter related to processing of the first data packets, to receive requirement information related to the operation of the application program, and to adjust values of the at least one first parameter based on at least a part of the requirement information, and cause the network device interface to transmit and receive the first data packets using at least some of the adjusted values of the first parameters.

19 Claims, 12 Drawing Sheets

(51) Int. Cl.
*H04L 29/06* (2006.01)
*H04W 4/70* (2018.01)

(56) References Cited

U.S. PATENT DOCUMENTS

| | | | |
|---|---|---|---|
| 2017/0054595 A1* | 2/2017 | Zhang | H04L 41/12 |
| 2017/0185265 A1* | 6/2017 | Pierce | H04M 1/72569 |
| 2017/0366605 A1 | 12/2017 | Chang et al. | |
| 2018/0139645 A1 | 5/2018 | Yu et al. | |
| 2018/0184413 A1 | 6/2018 | Rong et al. | |

OTHER PUBLICATIONS

International Search Report dated Oct. 11, 2019 in connection with International Patent Application No. PCT/KR2019/008104, 3 pages.
Written Opinion of the International Searching Authority dated Oct. 11, 2019 in connection with International Patent Application No. PCT/KR2019/008104, 5 pages.
Supplementary European Search Report in connection with European Patent Application No. EP19829782.2 dated Apr. 14, 2021, 7 pages.

\* cited by examiner

APPARATUS AND METHOD FOR ADJUSTING NETWORK PARAMETER

CROSS-REFERENCE TO RELATED APPLICATIONS

This application is based on and claims priority under 35 U.S.C. 119 to Korean Patent Application No. 10-2018-0077228, filed on Jul. 3, 2018, in the Korean Intellectual Property Office, the disclosure of which is herein incorporated by reference in its entirety.

BACKGROUND

1. Field

Various embodiments of the disclosure relate to an apparatus and method for adjusting network parameters.

2. Description of Related Art

The above information is presented as background information only to assist with an understanding of the disclosure. No determination has been made, and no assertion is made, as to whether any of the above might be applicable as prior art with regard to the disclosure.

In order to meet the demand for wireless data traffic that has substantially increased since the 4th generation (4G) communication system came to the market, efforts have been made to develop enhanced 5th generation (5G) communication systems or pre-5G communication systems. For this reason, the 5G communication system or pre-5G communication system are called a beyond 4G network communication system or post long term evolution (LTE) system.

To achieve a high data rate, implementation of the 5G communication system in an ultra-high frequency (mm-Wave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate propagation path loss and to increase propagation distance in the ultra-high frequency band.

For system network improvement, in the 5G communication system, techniques such as an evolved small cell, an advanced small cell, a cloud radio access network (RAN), an ultra-dense network, device to device (D2D) communication, a wireless backhaul, a moving network, cooperative communication, coordinated multi-points (CoMPs), and interference cancellation have been developed.

Meanwhile, the international telecommunication union (ITU) has classified network service categories that can be provided through a 5G communication system into ultra-reliable and low latency communication (URLLC) services, enhanced mobile broadband (eMBB) services, and massive machine type communication (mMTC) services.

SUMMARY

The 5G communication system may provide three network service categories and may require different network requirements and evaluation criteria for each service category. The network performance of an electronic device may vary depending on the network requirements and evaluation criteria of the service category required by applications. Network parameters that determine the network performance of the electronic device may be used fixedly as a single optimized value. Thus, in the 5G communication system that includes three variable service categories, the electronic device may not exhibit optimal network performance.

In accordance with an aspect of the disclosure, an electronic device may include: a wireless communication modem; at least one processor configured to be connected to the communication modem; a volatile memory configured to be operatively connected to the processor; and a non-volatile memory configured to store at least one application program and to be operatively connected to the processor. The non-volatile memory may be configured to store, when executed, instructions that cause the processor to transmit and receive first data packets to and from the communication modem and to provide a network device interface including at least one first parameter related to processing of the first data packets, to receive requirement information related to the operation of the application program, and to adjust values of the at least one first parameter based on at least a part of the requirement information, and cause the network device interface to transmit and receive the first data packets using at least some of the adjusted values of the first parameters.

An electronic device according to various embodiments of the disclosure can exhibit optimal network performance by adjusting network parameters according to various network requirements of a communication system.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
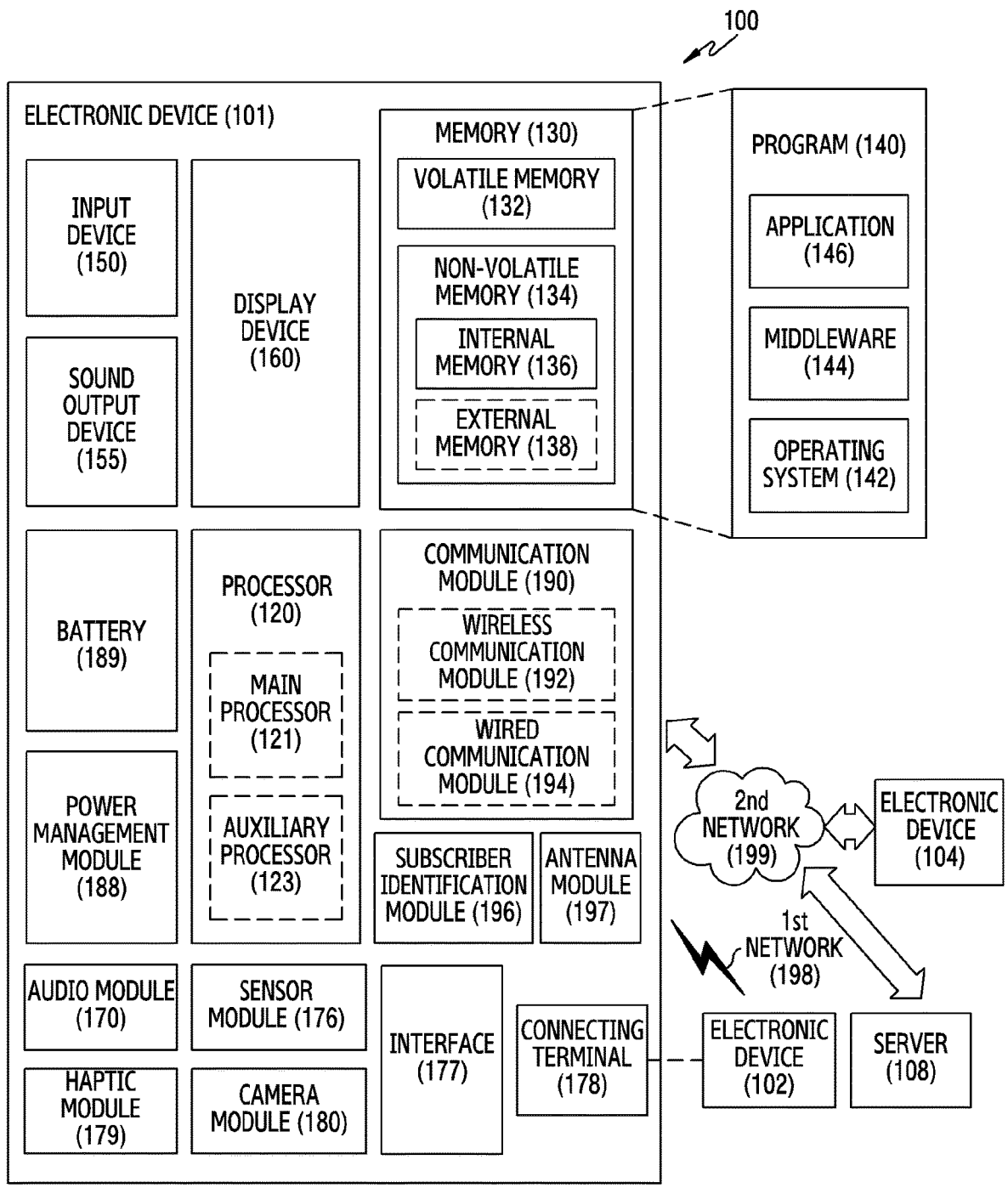
FIG. 1 is a block diagram illustrating an electronic device in a network environment according to various embodiments of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi™) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
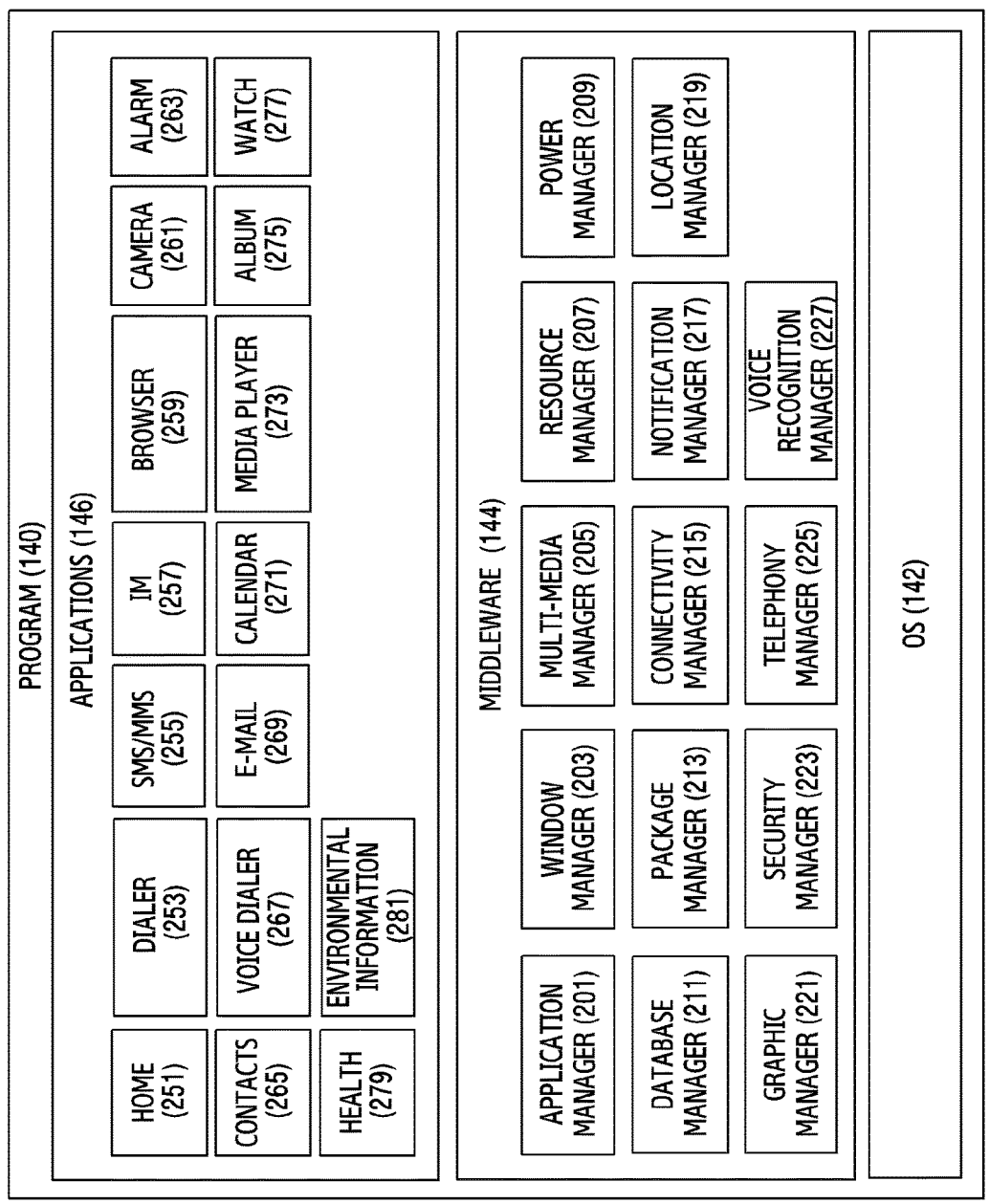
FIG. 2 is a block diagram illustrating a program according to various embodiments of the disclosure.

FIG. 2 is a block diagram 200 illustrating a program 140 according to various embodiments of the disclosure.

According to an embodiment, the program 140 may include an operating system 142 for controlling one or more resources of the electronic device 101, a middleware 144, and an application 146 executable on the operating system 142. The operating system 142 may include, for example, Android™, iOS™, Windows™, Symbian™, Tizen™, or Bada™. At least some of the programs 140 may be, for example, preloaded into the electronic device 101 at the time of manufacture, or downloaded or updated from an external electronic device (e.g., the electronic device 102 or 104 or the server 108) during use by a user.

The operating system 142 may control (e.g., allocate or recover) one or more system resources (e.g., a process, a memory, or a power source) of the electronic device 101. The operating system 142 may additionally or alternatively include other hardware devices of the electronic device 101, e.g., an input device 150, a sound output device 155, a display device 160, an audio module 170, a sensor module 176, an interface 177, a haptic module 179, a camera module 180, a power management module 188, a battery 189, a communication module 190, a subscriber identification module 196, and one or more driver programs for driving an antenna module 197.

The middleware 144 may provide various functions to an application 146 so that the application 146 may use the functions or information provided by the one or more resources of the electronic device 101. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information required for the operation of the electronic device 101 using the corresponding information. According to an embodiment, the power manager 209 may interoperate with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and an external electronic device. The notification manager 217, for example, may provide a function to notify a user of an occurrence of a certain event (e.g., an incoming call, a message, or an alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit user's voice data to the server 108, and receive, from the server 108, a command corresponding to a function to be executed on the electronic device 101 based at least in part on the voice data, or text data converted based at least in part on the voice data. According to an embodiment, the middleware 144 may dynamically delete some existing components or add new components. According to an embodiment, at least part of the middleware 144 may be included as part of the OS 142 or may be implemented as another software separate from the OS 142.

The application 146 may include, for example, a home application 251, a dialer application 253, a short message service (SMS)/multimedia messaging service (MMS) application 255, an instant message (IM) application 257, a browser application 259, a camera application 261, an alarm application 263, a contact application 265, a voice recognition application 267, an email application 269, a calendar application 271, a media player application 273, an album application 275, a watch application 277, a health application 279 (e.g., an application for measuring the degree of workout or biometric information, such as blood sugar level), or an environmental information application 281 (e.g., an application for measuring air pressure, humidity, or temperature information). According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, a message, or an alert) to the external electronic device or a device management application adapted to manage the external electronic device. The notification relay application may transfer notification information corresponding to an occurrence of a certain event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus of the display device 160 or the camera module 180) of the external electronic device communicating with the electronic device 101 or some component thereof (e.g., the display device 160 or the camera module 180). The device management application, additionally or alternatively, may support installation, deletion, or updating of an application running on the external electronic device.

An electronic device according to various embodiments disclosed herein may be various types of devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with,", it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the invoked at least one instruction. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more components of the above-described components or operations may be omitted, or one or more other components or operations may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3A:
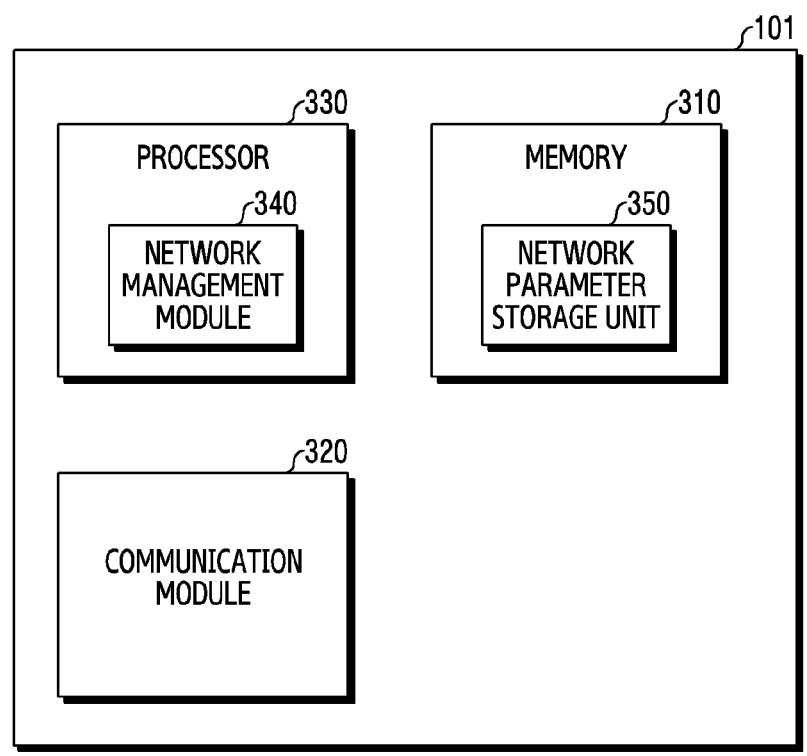
FIG. 3A is a block diagram illustrating an electronic device according to various embodiments of the disclosure.

FIG. 3A is a block diagram illustrating an electronic device 101 according to various embodiments of the disclosure.

The electronic device 101 shown in FIG. 3A can be configured, for example, at least partially similar to or the same as the electronic device 101 of FIG. 2.

Referring to FIG. 3A, in various embodiments, a memory 310 may store instructions that control the electronic device 101, control command codes, control information, or user data. For example, the memory 310 may include an application, an operating system (OS), a middleware, and a device driver. According to an embodiment, the memory 310 may include one or more of volatile memory and non-volatile memory. The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), and the like.

The non-volatile memory may include a read only memory (ROM), a programmable ROM (PROM), an electrically programmable ROM (EPROM), an electrically erasable ROM (EEPROM), a flash memory, and the like. According to one embodiment, the memory 310 may include a non-volatile medium such as a hard disk drive (HDD), a solid state disk (SSD), an embedded multimedia card (eMMC), a universal flash storage (UFS), or the like.

According to various embodiments, the memory 310 may include a network parameter storage unit 350. The network parameter storage unit 350 may store setting values related to a network parameter. The network parameters may include parameters related to data packet processing and/or parameters related to the capacity of a buffer memory.

For example, the parameters related to data packet processing may include a parameter for indicating whether to merge and process a plurality of packets and a parameter for indicating a capability of processing a plurality of packets.

As another example, the parameter related to the capacity of the buffer memory may include parameters for indicating the size for the buffer memory of a plurality of layers (e.g., a transmission control protocol (TCP) layer, an Internet protocol (IP) layer, or a user datagram protocol (UDP) layer) included in a network stack 370. The parameter related to the capacity of the buffer memory may include parameters for indicating the size of a transmission buffer memory and/or the size of a reception buffer memory.

In various embodiments, the network parameter storage unit 350 may store setting values of predetermined network parameters based on the network service category. The network service category may refer to a network service category classified into three in the 5G communication system. The network service category includes an ultra-reliable and low latency communication (URLLC) service, an enhanced mobile broadband (eMBB) service, and a massive machine type communication (mMTC) service. The network parameter storage unit 350 may store setting values of network parameters corresponding to each of three network service categories. For example, the network parameter storage unit 350 may store the setting values in the form of a table.

an eMBB service, the processor 120 may refer to the first row. The processor 120 may change the settings of the network parameters to parameters such as napi_weight=256, netdev_max_backlog=300K, socket_rmem=8M, netdev_budget=300, and GRO state=inactive (or enable, one, or on).

Table 1 shows network parameter setting values according to the URLLC service, the mMTC service, and the eMBB service, but is not limited thereto. According to various embodiments, the network service category is not limited to the URLLC service, the mMTC service, and the eMBB service, and may further include or omit various network service categories. According to various embodiments, the network parameters are not limited to napi_weight, netdev_max_backlog, socket_rmem, netdev_budget, and GRO state, and may further include or omit various network parameters.

In various embodiments, the communication module 320 may generate a communication path between the electronic device 101 and an external electronic device (e.g., the electronic device 102 or 104). In various embodiments, the communication path may be an indirect communication path requiring an intermediate node, such as an access point (AP), a base station. For example, the communication path may include one or more of a cellular communication-based path such as a long term evolution (LTE) or 5G system and a wireless local area network (WLAN) communication-based path such as wireless fidelity (Wi-Fi). In various embodiments, the communication path may be a direct communication path that does not require the intermediate node. For example, the communication path may include one or more of a Bluetooth communication-based path, a Bluetooth lo energy (BLE) communication-based path, an LTE sidelink communication-based path, and a Wi-Fi direct communication-based path.

In various embodiments, the communication path may be a wired communication path or a wireless communication path. The electronic device 101 may receive signals, data, information, or messages from the external electronic device (e.g., the electronic device 102 or 104) via the communication path. The electronic device 101 may transmit signals,

TABLE 1

|  | napi_weight | netdev_max_backlog | socket_rmem | netdev_budget | GRO_state |
|---|---|---|---|---|---|
| eMBB service | 256 | 300K | 64M | 500 | ○ |
| URLLC service | 64 | 50K | 8M | 300 | X |
| mMTC service | 64 | 100K | 8M | 500 | X |

Referring to Table 1, each row may represent a URLLC service, an eMBB service, and a mMTC service. Each column may represent network parameters included in a Linux operating system (OS) according to an embodiment. For example, if an application requires the URLLC service, the processor 120 may refer to the second row. The processor 120 may change the setting values of at least one parameter of napi_weight, netdev_max_backlog, socket_rmem, netdev_budget, and GRO state. The processor 120 may refer to the setting values of the network parameters for supporting the URLLC service by referring to the second row of Table 1. For example, if the application requires a URLLC service, the processor 120 may change the setting of the network parameters to parameters such as napi_weight=64, netdev_max_backlog=50K, socket_rmem=8M, netdev_budget=300, and GRO state=inactive (or disable, zero, or off). As another example, if the application requires data, information, or messages to the external electronic device (e.g., the electronic device 102 or 104 or the server 108) via the communication path.

In various embodiments, the processor 120 may control the overall operation of the electronic device 101. For example, the processor 120 may transmit or receive the signals, data, information, or messages to or from the external electronic device 102 via the communication module 320. The processor 120 may write or read data to or from the memory 310. For example, the processor 120 may read network parameter values to support the network operation required by the application. The processor 120 may perform the functions of a protocol stack required by the communication standard.

Figure 3B:
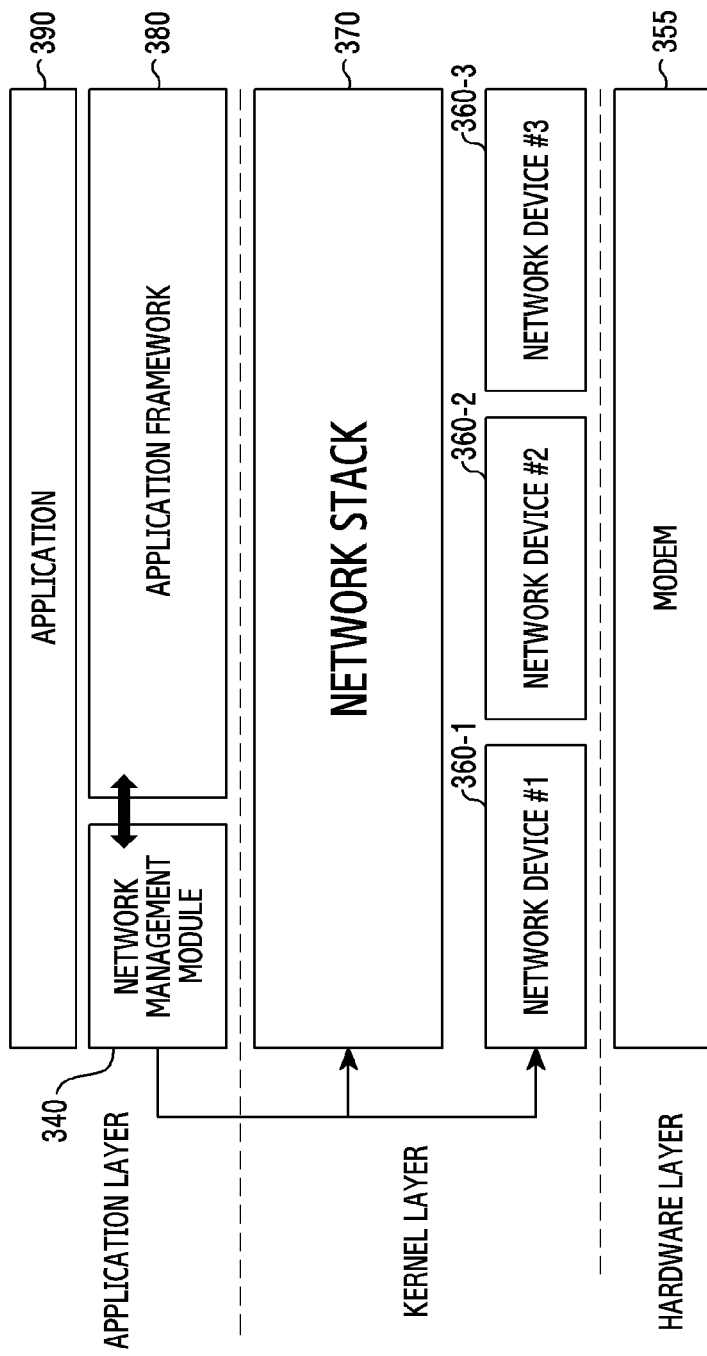
FIG. 3B illustrates a hierarchical structure of an electronic device according to various embodiments of the disclosure.

FIG. 3B illustrates a hierarchical structure of the electronic device 101 according to various embodiments of the disclosure.

Referring to FIG. 3B, the electronic device 101 according to various embodiments may include a modem 355 (e.g., the communication module 320 of FIG. 3A) that is a hardware layer, a kernel layer that is executed in a processor (e.g., the processor 330 of FIG. 3A), and an application layer. The kernel layer and the application layer may be software and/or sets of instructions.

According to an embodiment, the modem 355 may perform conversion between physical signals and electrical signals for the purpose of transmitting and receiving data between an external electronic device (e.g., the electronic device 102 or 104 or the server 108) and the electronic device 101. For example, the modem 355 may convert a packet composed of an electrical signal into a physical signal and may transmit the converted result wirelessly to the external electronic device. As another example, the modem 355 may convert a physical signal transmitted from the external electronic device and wirelessly received to a packet of an electrical signal.

According to an embodiment, the kernel layer may include network devices 360-1 to 360-3 and a network stack 370. The network devices 360-1 to 360-3 may provide an interface between the physical layer and the kernel layer. The network stack 370 may receive packets from the network devices 360-1 to 360-3 and may forward the received packets to the application layer if they are normal packets.

According to an embodiment, the application layer may include an application framework 380, an application 390, and a network management module 340. The application framework 380 may correspond to the middleware 144 shown in FIG. 1. The application 390 may correspond to the application 146 shown in FIG. 1.

The network management module 340 according to various embodiments may be located at the application layer. The network management module 340 may receive information related to a network service category requested by the executed application from the application framework 380. The network management module 340 may instruct the adjustment of network parameters on the basis of the information related to the network service category. For example, the network management module 340 may transmit control signals to the network devices 360-1 to 360-3 to adjust parameters related to napi_weight, netdev_max_backlog, and GRO state. As another example, the network management module 340 may transmit a control signal to the network stack 370 to adjust parameters related to netdev_budget, TCP/UDP socket_mem.

In the above-described embodiments, the napi_weight, netdev_max_backlog, GRO state, netdev_budget, and TCP/UDP socket_mem parameters are described for a Linux operating system (OS), but are not limited thereto.

According to various embodiments, the electronic device 101 may operate based on another OS (e.g., OS including at least one of Windows™, Mac™, Android™, and iOS™). In the case of the electronic device 101 operating based on the other OS, the electronic device 101 may adjust parameters corresponding to the napi_weight, netdev_max_backlog, GRO state, netdev_budget, and TCP/UDP socket_mem parameters among the parameters of the other OS, based on the network service category of the 5G communication system.

Figure 4:
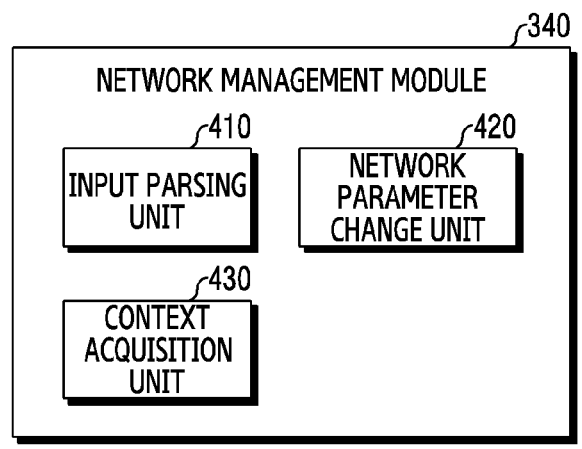
FIG. 4 is a block diagram illustrating a network management module according to various embodiments of the disclosure.

FIG. 4 is a block diagram illustrating a network management module according to various embodiments of the disclosure.

The network management module shown in FIG. 4 may correspond to, for example, the network management module 340 shown in FIG. 3A.

Referring to FIG. 4, the network management module 340 according to various embodiments may include an input parsing unit 410, a network parameter change unit 420, and a terminal context acquisition unit 430.

According to various embodiments, the input parsing unit 410 may receive information indicating a network service category from an application. Each of a plurality of applications included in the electronic device 101 may store information on the network service category to be operated according to an application characteristic and purpose. For example, in the case of a first person shooter (FPS) game, a low latency service may be used for immersive services because the first person's point of view is changed in real time according to a user input. For another example, in the case of a file transfer protocol (FTP) service for quickly transmitting and receiving a large number of files, an increase in download and/or upload speed may be required. Accordingly, the application may provide the information on the network service category required according to the application characteristic and type to the input parsing unit 410. For example, the application for the FPS game may provide information requesting the URLLC service for a low latency to the input parsing unit 410. In another example, the FTP service application may provide information requesting the eMBB service to the input parsing unit 410. The input parsing unit 410 may receive the information on the network service category from the application and may decode the received information to identify a service required by the application.

According to various embodiments, the network parameter change unit 420 may change the network parameters based on the network service category. According to an embodiment, the network parameter change unit 420 may transmit a control signal instructing the network stack 370 to change parameter setting value. The control signal provided to the network stack 370 may include information for changing the values of TCP/UDP socket_mem and netdev_budget. According to another embodiment, the network parameter change unit 420 may transmit a control signal instructing the network devices 360-1 to 360-3 to change the parameter setting values. The control signal provided to the network devices 360-1 to 360-3 may include information for changing the values of napi_weight, netdev_max_backlog, and GRO state.

According to various embodiments, the terminal context acquisition unit 430 may acquire information on the context of the electronic device 101. For example, the information on context of the electronic device 101 may include information on the internal and/or external temperature of the electronic device 101. The terminal context acquisition unit 430 may be operatively connected to the sensor module 176 shown in FIG. 1. The terminal context acquisition unit 430 may acquire sensor data on the internal temperature and/or external temperature of the electronic device 101 from a temperature sensor (not shown) included in the sensor module 176. As another example, the information on context of the electronic device 101 may include information on the battery of the electronic device 101. The terminal context acquisition unit 430 may be connected to the power management module 188 and/or the battery 189 shown in FIG. 1. The terminal context acquisition unit 430 may acquire data on the remaining amount of the battery of the electronic device 101 from the power management module 188 or the battery 189.

According to various embodiments, the terminal context acquisition unit 430 may generate information indicating that a change in a network parameter should be bypassed based on the information on context of the electronic device 101. For example, the terminal context acquisition unit 430 may store a threshold value for the internal temperature of the electronic device and/or a threshold value for the remaining amount of the battery. The terminal context acquisition unit 430 may generate and transmit information for instructing the network parameter change unit 420 to bypass the change in the network parameter when the internal temperature of the electronic device 101 exceeds a threshold value (e.g., 80 degrees Celsius) stored in advance. The terminal context acquisition unit 430 may generate and provide information instructing the network parameter change unit 420 to bypass the change in the network parameter when the remaining amount of the electronic device 101 is less than a threshold value (e.g., 5% or less) stored in advance. The network parameter change unit 420 may receive the information for instructing the network parameter change unit 420 to bypass the change in the network parameter, and may not perform a change to a network parameter setting value corresponding to the network service category received from the input parsing unit 410. Since the terminal context acquisition unit 430 generates and provides the information for instructing the network parameter change unit 420 to bypass the change in the network parameter, the electronic device 101 may not change the network parameter setting value in a situation where the internal temperature is extremely high, whereby additional heat generation can be prevented. The electronic device 101 may not change the network parameter setting value in a situation where the remaining amount of the battery is significantly small so that the power consumption may not be increased, thereby increasing the driving time of the electronic device 101.

Figure 5:
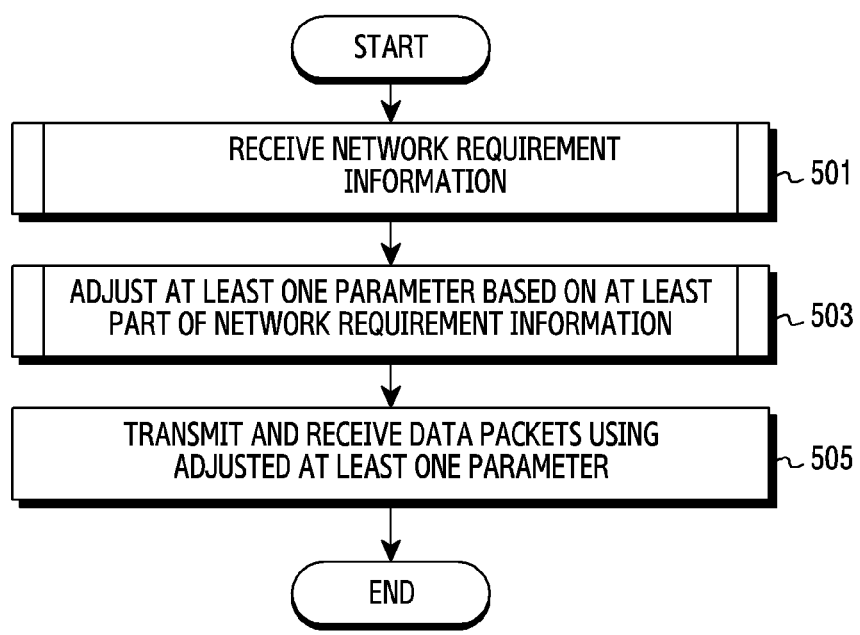
FIG. 5 illustrates a flowchart for adjusting the network parameter of an electronic device according to various embodiments of the disclosure.

FIG. 5 illustrates a flowchart for adjusting the network parameter of an electronic device according to various embodiments of the disclosure.

The electronic device shown in FIG. 5 may correspond to, for example, the electronic device 101 shown in FIG. 1

Referring to FIG. 5, in operation 501, the electronic device 101 (e.g., the processor 120) according to various embodiments may receive network requirement information. The network requirement information may include information for indicating one category of the network service categories. For example, the network requirement information may include information indicating one service of a URLLC service, a mMTC service, and an eMBB service.

According to various embodiments, the processor 120 may receive the network requirement information from the input parsing unit 410.

According to various embodiments, the processor 120 may receive information on the network service category of an application from the input parsing unit 410. The input parsing unit 410 may acquire information requesting the network service category of one service of the URLLC service, the mMTC service, and the eMBB service from the application. The processor 120 may acquire the information requesting the network service category of one service of the URLLC service, the mMTC service, and the eMBB service received from the input parsing unit 410, and may load the network parameter setting value corresponding to the acquired information from the memory 310.

According to various embodiments, a time point at which the processor 120 receives the information on the network service category from the input parsing unit 410 may be determined at least based on a time point of socket generation or a time point of session connection request. For example, when transmitting user data to an external electronic device (e.g., the electronic device 102 or 104 or the server 108) or receiving user data from the external electronic device, the corresponding application may generate (or open) a socket to internally allocate a resource so that communication with the external electronic device can be performed. The application may identify the network service category required at the time of socket generation and may transmit the information on identified network service category to the input parsing unit 410. As another example, the processor 120 may request session establishment for transmitting user data from the external electronic device. The application may identify the network service category required at the time of requesting the session establishment for transmitting user data, and may transmit the information on identified network service category to the input parsing unit 410. The input parsing unit 410 may transmit the network requirement information to the processor 120 at least based on the information on required network service category from the application.

According to various embodiments, the time point at which the processor 120 receives the information on the network service category is not limited to the time point of socket generation or the time pint of session connection request. According to various embodiments, the application may perform monitoring on a network communication condition during operation of the application. Thus, the application may identify that the required network service category is changed based on the monitoring result of the network communication condition. In response to identifying that the required network service category is changed, the application may transmit information on the changed network service category to the input parsing unit 410.

According to various embodiments, the processor 120 may load the network parameter setting value corresponding to the network service category from the memory 310. For example, the input parsing unit 410 may acquire the network requirement information from the application. The network requirement information may include an indication of one service of the URLLC service, the mMTC service, and the eMBB service. The processor 120 may request and receive, from the memory 310, parameter values for supporting the service indicated by the network requirement information received from the input parsing unit 410.

In operation 503, the processor 120 may adjust at least one parameter at least based on the network requirement information. The network requirement information may include information for indicating one service category of the network service categories. For example, when the application requires the URLLC service, the processor 120 may receive, from the network parameter storage unit 350, a setting value of at least one network parameter for supporting the URLLC service. The at least one network parameter setting value for supporting the URLLC service may include at least one of napi_weight=64, netdev_max_backlog=50K, socket_rmem=8M, netdev_budget parameter =300, and GRO state=inactive.

According to an embodiment, the processor 120 may adjust at least one parameter further based on the operating state of the application. For example, the processor 120 may know from the input parsing unit 410 that the network service category requested by the application corresponds to the eMBB. Next, the processor 120 may identify the number of currently running applications and the CPU occupancy state. This is because it may not be possible to change the network parameter to the setting values required in Table 1 due to limited resources (e.g., a lack of the memory that can be allocated for one application) if a plurality of applications are running. The processor 120 may forcibly kill at least one application among the plurality of running applications or may reduce a resource size allocated to the at least one application (e.g., reduce at least one setting value of socket_rmem, napi_weight, netdev_max_backlog, and netdev_budget of another application currently using the eMBB service), thereby providing the service of the application requiring the network service category.

In various embodiments, the processor 120 may adjust the at least one parameter further based on detailed information on the application. Even in the same URLLC service, a delay time required depending on the application operation or type may be different. For example, an application for autonomous driving or healthcare services may require an extremely fast response time. For another example, in the case of a game application, it may require the minimum response time required in the 5G communication system. Thus, the processor 120 may further adjust the at least one parameter based on the detail information. For example, the processor 120 may receive detailed information indicating a delay time of 0.01 ms from the application. The processor 120 may further adjust the network parameter setting value for supporting the URLLC service. For example, in order to satisfy the delay time of 0.01 ms, the values of napi_weight, netdev_budget, netdev_max_backlog, and TCP/UDP socket_mem shown in Table 1 may be further reduced.

In operation 505, the processor 120 may transmit and receive data packets using the adjusted at least one parameter. The processor 120 may determine to adjust the at least one parameter via operation 503, and may transmit corresponding information to the network parameter change unit 420. The network parameter change unit 420 may transmit an internal signal indicating to change the at least one parameter setting value to the network device and/or the network stack located at the kernel layer. The processor 120 may transmit and receive data packets based on the adjusted network parameter, thereby performing communication satisfying the network requirement.

Figure 6:
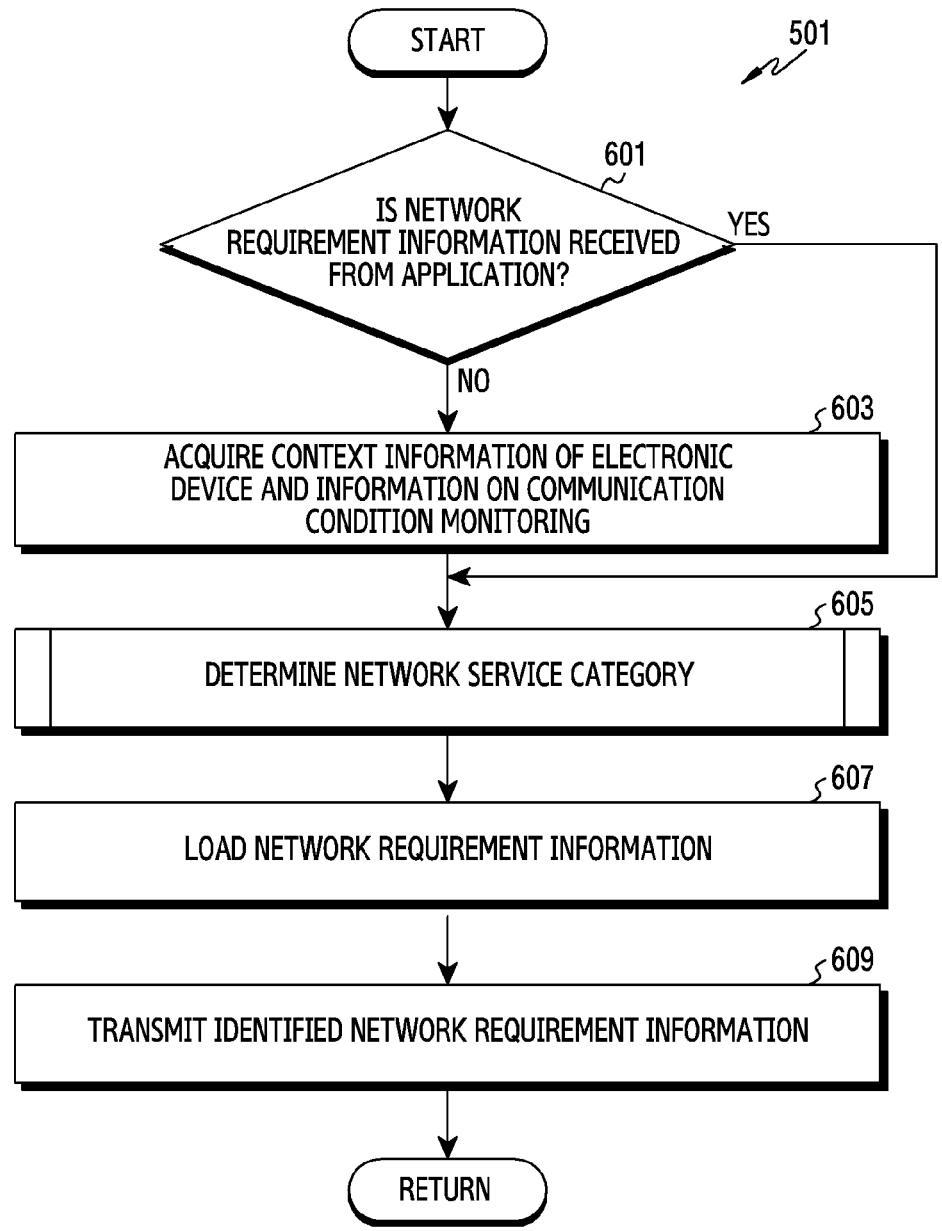
FIG. 6 illustrates a flowchart for receiving network requirement information according to various embodiments of the disclosure.

FIG. 6 illustrates a flowchart for receiving network requirement information according to various embodiments of the disclosure.

The electronic device of FIG. 6 may correspond to, for example, the electronic device 101 shown in FIG. 1. In FIG. 6, the processor 120 of the electronic device 101 may include operations of operation 501 of receiving network requirement information.

Referring to FIG. 6, in operation 601, the electronic device 101 (e.g., the processor 120) may determine whether it has received information on the network service category from an application. The information on the network service category may include information that explicitly indicates the network service category, as well as information that non-explicitly indicates the network service category.

According to an embodiment, the application may explicitly transmit the information on the network service category requested by the application, to the processor 120. The application may transmit information explicitly indicating the network service category by transmitting the network requirement information to the processor 120. For example, the information on the network service category requested by the application may include information for indicating one of URLLC, eMBB, and mMTC. The processor 120 may receive, from the application, the information on the network service category requested by the application at the time of generation (or open) of a transmission/reception socket and a time point of session request for communication.

According to another embodiment, the application may non-explicitly transmit the information on the network service category to the processor 120 based on the operational state of the application. The non-explicitly transmitted information on the network service category may be determined based on the operating state of the application. For example, the application may receive a user input that instructs to perform an FTP download/upload operation or to play a video having a ultra-high definition (UHD) resolution. The application may receive the user input and may transmit, to the processor 120, information for indicating that the FTP download/upload operation or the reproduction of the video with the UHD resolution is to be performed. The processor 120 may receive, from the application, the information for indicating that he FTP download/upload operation or the reproduction of the video with the UHD resolution is to be performed, and may determine to provide one service of the URLLC service, eMBB service, and mMTC service. Since the FTP download/upload or the reproduction of the video with the UHD resolution is a service requiring quick download of a large number of files, the processor 120 may refer to the setting value of the network parameter for supporting the eMBB service related to high-speed transmission.

As another example, the application may not explicitly transmit information for supporting the URLLC service to the processor 120, but may require a quick response (low delay) or reliable transmission. The application requesting the quick response may include applications related to virtual reality (VR), augmented reality (AR), autonomous driving, health care services, and games. In the case of applications related to the VR, AR, and games, an immersive service can be provided to a user through low-delay communication. In the case of the autonomous driving and healthcare services, when a delay occurs in the response time, the safety of the user can be greatly affected so that low-delay communication may be important. The application requesting the reliable transmission may include an application for transmitting a message for controlling robots and household appliances. The message for controlling the robots and the home appliance may cause malfunction of the corresponding device if transmission fails, so that reliable communication may be required. The processor 120 may receive information through the reliable communication and/or the quick response even though it does not explicitly receive information for supporting the URLLC service, and may refer to the network parameter setting value for providing the URLLC service.

As another example, the processor 120 may not explicitly receive information for supporting the mMTC service from the application. In the case of a messenger application, it may not require the transmission of a large number of files such as eMBB and may not require quick download/upload. Also, the messenger application does not require the immersive service based on the low-delay communication such as the VR, AR, and games. Since the messenger application is not a control message related to the operation of a specific device, it may not require reliable communication. Accordingly, when receiving the information on the network service category from the messenger application, the processor 120 may refer to the network parameter setting value for the mMTC service.

As another example, the processor 120 may determine the network service category based on the setting value associated with a session service continuity (SSC) mode. The SSC mode is a mode defined to provide various levels of service continuity according to the type of a terminal and the application in the 5G communication system. The SSC mode may include the following three modes: an SSC mode 1 may correspond to a mode for instructing a session connection using a fixed network. An SSC mode 2 and an SSC mode 3 may correspond to a mode for instructing a session connection using a network physically close to the electronic device 101. Specifically, the SSC mode 2 may establish a session using the network physically close to the electronic device 101, but may move the session connection using another physically close network when the SSC mode 2 is out of the physical area supported by the connected network. The SSC mode 3 may establish a new session using another network while maintaining the session connection using a physically close network, and then may release the session connection using an existing physically close network. According to an embodiment, the application may transmit information indicating the SSC mode to the network stack 370. For example, an application requiring reliability in data transmission or requiring a low delay time may transmit information indicating the SSC mode 2 or the SSC mode 3 to the network stack 370. The processor 120 may request the session connection based on information indicating the SSC mode from the application. Since the SSC mode 2 or the SSC mode 3 connects the session using the physically close network, the delay time can be improved. As another example, the application may transmit a request for changing the mode from the SSC mode 1 to the SSC mode 2 or the SSC mode 3 during the operation of the application. The application may monitor QoS in real time. If the delay time increases, the application may transmit a request for changing the SSC mode to the network stack 370, in order to achieve a delay time that is less than the maximum delay time required by the application.

In another example, the processor 120 may determine the network service category based on whether mobile edge computing (MEC) is interworking. The application may transmit information for instructing the processor 120 to interwork with an MEC server. The MEC server may refer to a cloud server located in a base station. The MEC server may reduce a delay time using the cloud server of a physically closer base station than a network end (for example, a data network (DN)) and may reduce a data passing time between the network ends, whereby the MEC server may be used in an application requiring the security. In various embodiments, the electronic device 101 may receive or determine the session or the type of service (e.g., information indicating the URLLC service or the eMBB service) from the connected MEC server and/or an MEC application on a server determined to be used. That is, the electronic device 101 may set the network parameter setting value to a value for supporting the eMBB service or the URLLC service according to the type of the interworking MEC application on the connected MEC server.

In operation 603, the processor 120 may acquire context information of the electronic device 101. The processor 120 may not receive explicit or non-explicit information on the network service category from the application. For example, the processor 120 may monitor whether the information on service category is received for a predetermined period of time from the time point of socket generation or the time point of session request of the application. When the information on service category is not received for the predetermined period of time from the time point of socket generation or the time point of session request for the purpose of data transmission/reception, the context information of the electronic device 101 may be requested. The context information may include sensor data on the temperature inside or outside the electronic device 101 or information on the remaining amount of the battery 189. For example, the processor 120 may request the sensor data from a temperature sensor (not shown) included in the sensor module 176 in order to acquire the sensor data on the temperature inside or outside the electronic device 101. In another example, the processor 120 may transmit a signal requesting information on remaining amount of the battery to the battery 189 and/or the power management module 188 in order to acquire the information on remaining amount of the battery of the electronic device 101.

In operation 605, the processor 120 may determine the network service category. The processor 120 may determine the network service category of the electronic device 101 based on the explicit or non-explicit information on the network service category received from the application. The processor 120 may determine the network service category of the electronic device 101 based on the acquired context information of the electronic device 101 if it fails to receive the information on the network service category from the application. According to an embodiment, the processor 120 may receive the information on the network service category from the application and may determine the network service category of the electronic device 101 based on the received information on the network service category.

In operation 607, the processor 120 may load network requirement information corresponding to the determined network service category. The processor 120 may receive the network parameter setting value stored in advance from the network parameter storage unit 350 according to the determined network service category. For example, when the determined network service category is URLLC, netdev_max_backlog, napi_weight, socket_rmem, netdev_budget, and GRO state parameters corresponding to the URLLC in Table 1 may be identified.

In operation 609, the processor 120 may transmit the identified network requirement information to the network management module 340. The processor 120 may transmit information indicating the network parameter setting value loaded from the network parameter storage unit 350, to the network parameter change unit 420.

Figure 7:
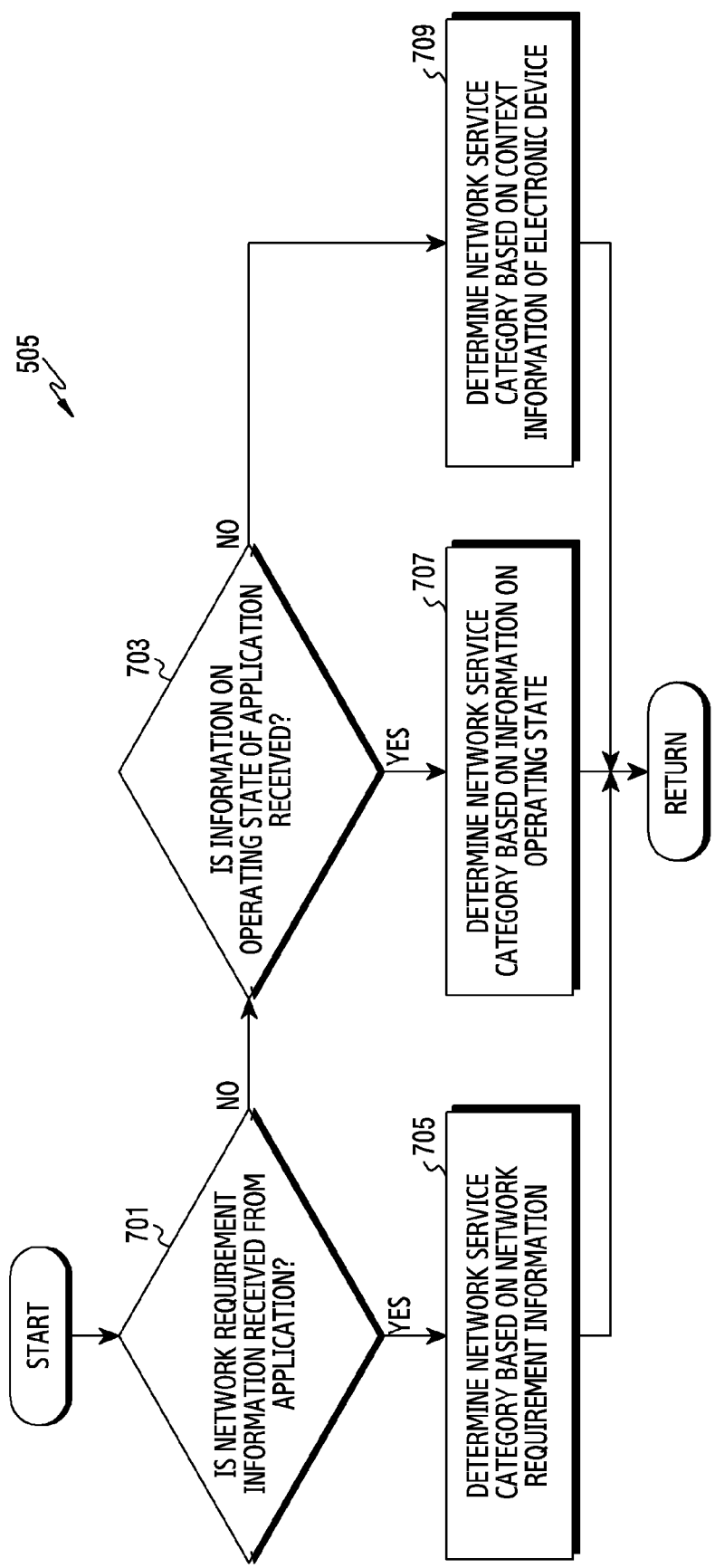
FIG. 7 illustrates a flowchart for determining a network service category according to various embodiments of the disclosure.

FIG. 7 illustrates a flowchart for determining a network service category according to various embodiments of the disclosure.

The electronic device of FIG. 7 may correspond to the electronic device 101 shown in FIG. 1. Operations shown in FIG. 7 may include operations of operation 605 of determining the network service category shown in FIG. 6.

Referring to FIG. 7, in operation 701, the processor 120 may determine whether it has received information indicating the network service category from an application. The information indicating the network service category may include information for indicating one service of the URLLC service, eMBB service, and mMTC service. For example, the processor 120 may perform operation 705 if it receives the information indicating the network service category. As another example, if the processor 120 fails to receive the information indicating the network service category, it may perform operation 703. In operation 705, the processor 120 may determine the corresponding network service category based on information that explicitly indicates the network service category.

In operation 703, the processor 120 may determine whether it has received information on operating state of the application. The information on operating state may include information on operating state of the application and the type of the application. For example, the processor 120 may receive, from the application, information indicating that an FPS game application has been executed. When receiving the information on operating state of the application, the processor 120 may perform operation 707. On the other hand, if the information on operating state of the application is not received, the processor 120 may perform operation 709.

In operation 707, the processor 120 may determine the network service category based on the information on operating state. For example, the processor 120 may determine to change the network service category to the network parameter setting value for the URLLC service that can satisfy the requirement of a quick response time in consideration of the characteristic of the FPS game application.

In operation 709, the processor 120 may determine the network service category based on the context information of the electronic device. The processor 120 may request the context information of the electronic device from the terminal context acquisition unit 430 when it fails to receive the information indicating the network service category and/or the information on operating state of the application from the application. The context information may include sensor data for the internal temperature of the electronic device 101 and/or information on the remaining amount of the battery of the electronic device. According to an embodiment, the processor 120 may determine to change the network parameter based on the received context information. For example, the processor 120 may change the network parameter to the network service category that can reduce heat generation when the internal temperature of the electronic device 101 exceeds a threshold temperature.

Figure 8:
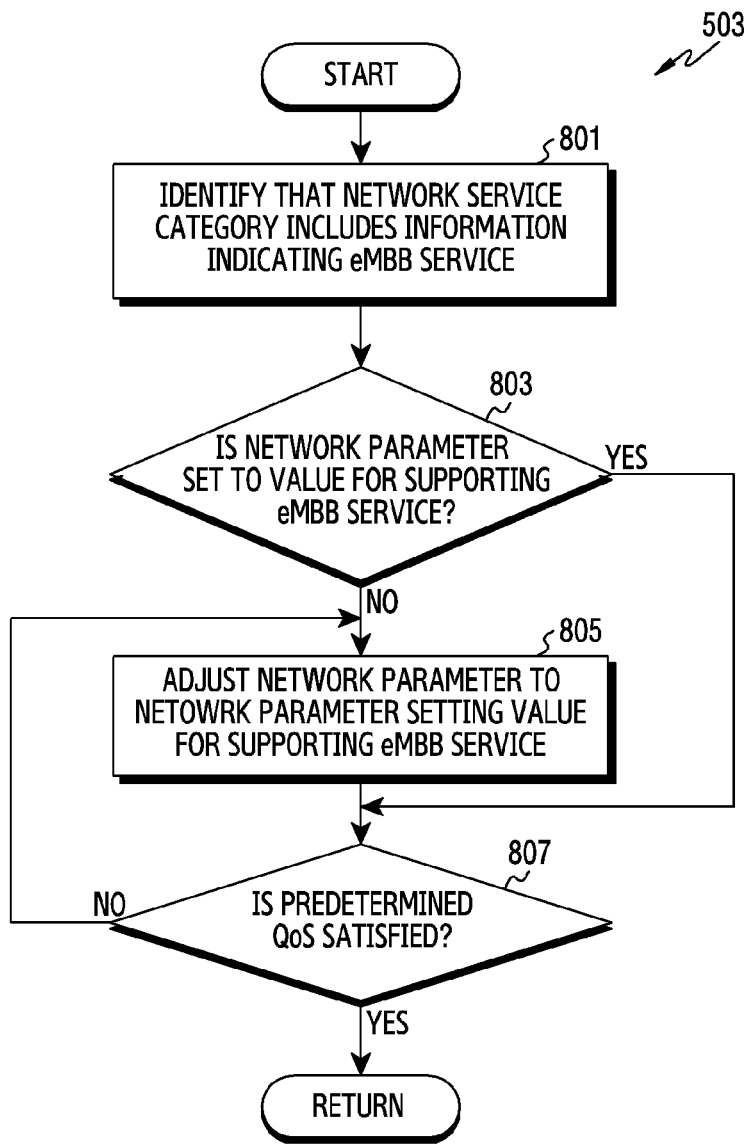
FIG. 8 illustrates a flowchart for adjusting the parameter of an electronic device when a network service category corresponds to an enhanced mobile broadband (eMBB) according to various embodiments of the disclosure.

FIG. 8 illustrates a flowchart for adjusting the parameter of the electronic device 101 when a network service category corresponds to an enhanced mobile broadband (eMBB) according to various embodiments of the disclosure.

The electronic device of FIG. 8 may correspond to the electronic device 101 shown in FIG. 1.

In operation 801, the processor 120 may identify whether the network requirement information includes the information indicating the eMBB service. For example, the processor 120 may explicitly receive the information on the network service category from the application. The application may transmit information indicating that the network service category requested by the application is the eMBB service, to the processor 120. In another example, the processor 120 may non-explicitly receive the information on the network service category from the application. The application may transmit the information non-explicitly indicating the network service category based on the operating state of the application. The application may non-explicitly indicate the network service category by transmitting information on the type of the application to the processor 120. For example, the type of the application may indicate at least one of VR, AR, game, autonomous driving, healthcare service, FTP download/upload, reproduction of a video. The processor 120 may identify that the network service category requested by the application is the eMBB service when receiving information related to the FT download/upload and the reproduction of the UHD video.

In operation 803, the processor 120 may determine whether the network parameter is set to a value for supporting the eMBB service. The processor 120 may compare the setting value of the network parameter and the network parameter setting value for supporting the eMBB service at the time of receiving the network requirement information, thereby determining whether the network parameter setting value is required to be adjusted.

For example, the electronic device 101 may be requested to perform a large-capacity FTP download while reproducing a video with a UHD resolution. The processor 120 may receive information for indicating the FTP download from the application at the time of generating a reception socket for FTP download or at the time of requesting a session connection for FTP download. The processor 120 may identify that the network service category requested by the application is the eMBB service, based on the information for indicating the FTP download. In addition, the processor 120 may identify the network parameter setting value at the time of generating the reception socket or at the time of requesting the session connection for FTP download. The processor 120 may transmit the request to the network parameter storage unit 350, and may return, to the processor 120, the network parameter value at the time of receiving the request in response to the request. The processor 120 may identify that the current network service category of the electronic device 101 corresponds to the eMBB service based on the returned current network parameter value. Accordingly, the processor 120 may determine that the current network parameter setting value determined in advance for watching the video with the UHD resolution and the network parameter setting value for the eMBB service are the same, and may perform operation 807.

In another example, the electronic device 101 may be requested to perform a large-capacity FTP download while executing the FPS game application. The processor 120 may receive, from the application, the information for indicating the FPT download at the time of generating the reception socket for the FTP download or at the time of requesting the session connection for the FTP download. The processor 120 may identify that the network service category requested by the application is the eMBB service, based on the information for indicating the FTP download. In addition, the processor 120 may identify the network parameter setting value at the time of generating the reception socket or at the time of requesting the session connection for FTP download. The processor 120 may transmit a request to the network parameter storage unit 350, and the network parameter storage unit 350 may return the network parameter value at the time of receiving the request in response to the request. Since the electronic device 101 has executed the FPS game application before being requested to perform FTP download, the returned network parameter setting value may correspond to the network parameter setting value for supporting the URLLC service. Accordingly, the processor 120 may determine that the current network parameter setting value is different from the network parameter setting value related to the eMBB service for FTP download, and may perform operation 805.

In operation 805, the processor 120 may adjust the network parameter to the network parameter setting value for supporting the eMBB service. In response to identifying that the network parameter at the time of receiving the network requirement information is not set to a value for supporting the eMBB service, the processor 120 may request the network parameter setting value for supporting the eMBB service from the network parameter storage unit 350. The network parameter storage unit 350 may transmit the network parameter setting value for supporting the eMBB service to the processor 120 in response to the request by referring to Table 1 above. The processor 120 may adjust the network parameter based on the network parameter setting value for supporting the eMBB service.

In various embodiments, the processor 120 may perform a change in at least one parameter of activating the GRO state, increasing the value of napi_weight, increasing the value of netdev_budget, increasing the value of TCP/UDP socket mem, and increasing the value of netdev_max_backlog.

For example, the processor 120 may activate the GRO state. The processor 120 may merge a plurality of packets from a network interface card (NIC) by activating the GRO state, enabling the GRO state, or setting the GRO state to 1. The NIC may correspond to the modem 355 of FIG. 3B. By merging and processing the plurality of packets, the number of acknowledgments (ACKs) to be transmitted may be reduced so that the load of a communication processor (CP) may be reduced. Also, since the plurality of packets are merged, the number of ACKs to be transmitted decreases, and the load on the CP can be reduced. Also, the processing load on the network stack 370 can be reduced because the plurality of packets are merged to perform a TCP checksum in advance.

For example, the processor 120 may increase the value of napi_weight. The value of napi_weight may refer to the maximum number of packets that can be fetched in one polling when the network devices 360-1 to 360-3 operate based on a new API. The processor 120 may increase the number of packets flowing from the NIC 355 to the network devices 360-1 to 360-3 by increasing the value of napi_weight.

For example, the processor 120 may increase the value of netdev_max_backlog. The value of netdev_max_backlog may refer to the maximum value of a packet that can be inserted into a backlog queue. The backlog queue refers to the length of the request in a standby state, in which the packet processing is not completed. If the backlog queue is filled up, the packet cannot be set to the standby state and a packet drop may occur. The processor 120 may increase the value of netdev_max_backlog to prevent the packet drop caused by filling up the backlog queue with packets and to insert more packets into the backlog queue so that the processing speed by at least one core processors included in the network device can be improved.

For example, the processor 120 may increase the value of netdev_budget. The value of netdev_budget may refer to the number of packets that can be processed when NET_RX_softirq occurs. For example, when the electronic device 101 receives a packet via the NIC 355, a hardware interrupt may occur. The processor 120 may generate the NET_RX_softirq to put the received packet into the reception socket. Thus, the value of netdev_budget is a parameter related to the number of packets that can be processed by NET_RX_softirq when the packet is received. Thus, the processor 120 may increase the value of netdev_budget to improve the transmission rate by processing many packets with a single scheduling.

For example, the processor 120 may increase the value of TCP/UDP_mem. The value of TCP/UDP_mem may refer to a memory value allocated to a socket buffer corresponding to an interface between the application layer and the network stack. In various embodiments, the processor 120 may increase TCP/UDP_wmem, TCP/UDP_rmem, rmem_default, and rmem_max as values for the size of the socket buffer. The value of TCP/UDP_wmem may refer to the size of a transmission buffer of a TCP/UDP network stack, and the value of TCP/UDP_rmem may refer to the size of a reception buffer of the TCP/UDP network stack. In various embodiments where the value of rmem_default is basically allocated for the reception buffer of the socket, the values for the size of the socket buffer may affect a TCP window size. If the TCP window size is small, the size of netdev_budget is large, so that a packet drop may be caused in the application layer even if netdev_budget is inserted into the backlog queue without any packet drop. If the size allocated to the socket buffer memory is small, a packet drop may occur in the application layer because the corresponding information is transmitted from the backlog queue to an upper layer but there is no space to store the corresponding information in the reception buffer. The processor 120 may increase the value of TCP/UDP_mem to prevent a packet drop at the application layer and to improve the transmission speed by processing a large number of packets.

In operation 807, the processor 120 may determine whether to satisfy a predetermined quality of service (QoS). The processor 120 may monitor the communication condition while the application is running. For example, when providing a video with a UHD resolution, the processor 120 is required to satisfy the minimum transmission rate (for example, 5 Gbps) for seamlessly reproducing the video. The processor 120 may monitor the transmission rate in real time while providing the video with the UHD resolution. The processor 120 may determine whether the minimum transmission rate for reproducing the video is satisfied while the video with the UHD resolution is provided.

According to an embodiment, the communication condition can be degraded based on various causes such as deterioration of a communication channel, interference between radio signals, and non-line-of-sight (NLOS) caused by an obstacle. If the communication condition is good, the minimum transmission rate of 5 Gbps can be satisfied. However, if the communication condition deteriorates, the transmission rate of 5 Gbps or less may be caused. When a real-time transmission rate does not satisfy 5 Gbps, the processor 120 may determine that a predetermined QoS is not satisfied, and may perform operation 805. If the QoS is not satisfied in real time, the processor 120 may additionally adjust the network parameters to satisfy the predetermined QoS. Although the network parameters are set according to the values of Table 1 stored in the network parameter storage unit 350, the processor 120 may additionally adjust at least one parameter of activating GRO state, increasing the value of napi_weight, increasing the value of netdev_budget, increasing the value of TCP/UDP socket mem, and increasing the value of netdev_max_backlog in order to satisfy the QoS. For example, if the minimum delay time of 1 ms cannot be satisfied due to deterioration of the communication condition, the processor 120 may additionally increase the value of TCP UDP_mem. When the value of the TCP/UDP_mem increases, the TCP window size increases so that the transmission rate can be improved.

According to various embodiments, the processor 120 may terminate the procedure without additionally adjusting the network parameters if the predetermined QoS is satisfied.

Figure 9:
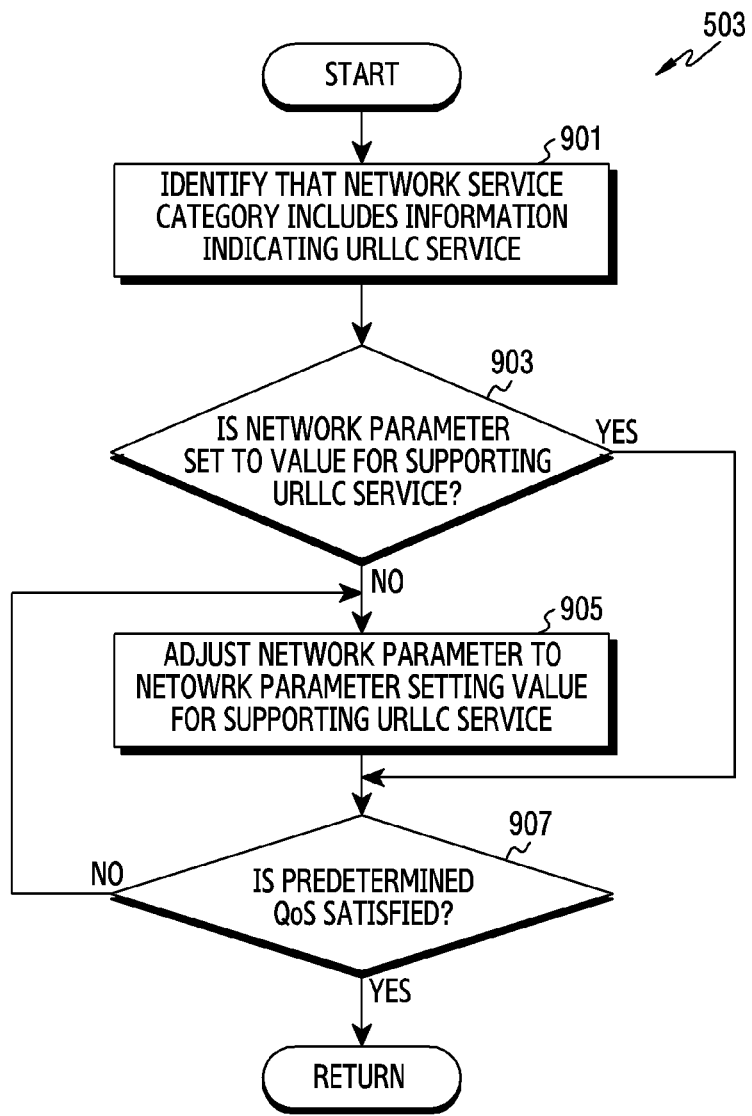
FIG. 9 illustrates a flowchart for adjusting the parameter of an electronic device when a network service category corresponds to a ultra-reliable low latency communication (URLLC) according to various embodiments of the disclosure.

FIG. 9 illustrates a flowchart for adjusting the parameter of the electronic device 101 when a network service category corresponds to a ultra-reliable low latency communication (URLLC) according to various embodiments of the disclosure.

The electronic device of FIG. 9 may correspond, for example, to the electronic device 101 shown in FIG. 1. In FIG. 9, the processor 120 of the electronic device 101 may include operations of operation 503 of adjusting at least one parameter based on network requirement information.

In operation 901, the processor 120 according to various embodiments may identify whether the network requirement information includes information indicating a URLLC service. For example, the processor 120 may explicitly receive information on the network service category from an application. The application may transmit, to the processor 120, information indicating that the network service category requested by the application is the URLLC service. As another example, the processor 120 may non-explicitly receive the information on the network service category from the application. The application may transmit information non-explicitly indicating the network service category based on the operating state of the application. The application may indicate the network service category by transmitting the information on type of the application to the processor 120. For example, the type of the application may indicate at least one of VR, AR, game, autonomous driving, healthcare service, FTP download/upload, and reproduction of a video with a UHD resolution. According to an embodiment, the processor 120 may determine to support the URLLC service when receiving information related to at least one of VR, AR, game, autonomous driving, and healthcare service from the application, and may identify that the network service category requested by the application corresponds to the URLLC service.

In operation 903, the processor 120 may determine whether the network parameter is set to a value for supporting the URLLC service. The processor 120 may compare the setting value of the network parameter at the time of receiving the network requirement information with the network parameter setting value for supporting the URLLC service, thereby determining whether the network parameter setting value is required to be adjusted. For example, the electronic device 101 may be requested to execute a VR application while executing an FPS game application. The processor 120 may receive information for indicating the VR application from the VR application at the time of generating a reception socket for the VR application or at the time of requesting a URLLC session connection for the VR application. The information for indicating the VR application may correspond to information for non-explicitly indicating the network service category to the processor 120. The processor 120 may identify that the network service category requested by the VR application is the URLLC service, based on the information for indicating the VR application. In addition, the processor 120 may identify the current network parameter setting value at the time of generating the reception socket or at the time of requesting the URLLC session connection for the VR application. The processor 120 may transmit a request to the network parameter storage unit 350. In response to the request, the network parameter storage unit 350 may return the network parameter value set at the time of receiving the socket or at the time of requesting the URLLC session connection. Accordingly, the processor 120 may identify that the network service category of the current electronic device 101 corresponds to the URLLC service, based on the returned network parameter value. Accordingly, the processor 120 may determine that the current network parameter setting value determined in advance for the FPS game application and the network parameter setting value for the URLLC service requested by the VR application are the same, and may perform operation 907.

In another example, the electronic device 101 may be requested to execute the VR application while watching a video with a UHD resolution. The processor 120 may receive information for indicating the VR application at the time of generating the reception socket for the VR application or at the time of requesting the URLLC session connection for the VR application. Based on the information for indicating the VR application, the processor 120 may identify that the required network service category is the URLLC service. In addition, the processor 120 may identify the parameter setting value set at the time of generating the reception socket for the VR application or at the time of requesting the URLLC session connection. The processor 120 may transmit a request to the network parameter storage unit 350 and the network parameter storage unit 350 may return the currently set network parameter value in response to the request. Since the video with the UHD resolution is watched before the electronic device 101 is requested to execute the VR application, the returned current network parameter setting value may correspond to the network parameter setting value for supporting the eMBB service. Accordingly, the processor 120 may determine that the current network parameter setting value is different from the network parameter setting value associated with the URLLC service for the VR application, and may perform operation 905.

In operation 905, the processor 120 may adjust the network parameters to the network parameter setting value for supporting the URLLC service. In response to identifying that the network parameter at the time of receiving the network requirement information is not set to the value for supporting the URLLC service, the processor 120 may request the network parameter setting value for supporting the URLLC service from the network parameter storage unit 350. In response to the request, the memory 310 may transmit the network parameter setting value for supporting the URLLC service to the processor 120 by referring to Table 1 above. The processor 120 may adjust the network parameter based on the network parameter setting value for supporting the URLLC service.

In various embodiments, the processor 120 may perform a change in at least one parameter of deactivating the GRO state, decreasing the value of napi_weight, decreasing the value of netdev_budget, decreasing the value of TCP/UDP socket mem, and decreasing the value of netdev_max_backlog.

For example, the processor 120 may deactivate the GRO state. The processor 120 may bypass the merge of packets in the NIC 355 by deactivating the GRO state. Since the NIC 355 does not merge a plurality of packets, the overall throughput is reduced compared to a case in which a plurality of packets are processed at one time, while the time required for merging the packets can be saved. Accordingly, the processor 120 may transmit the packet to an upper layer (for example, the network device or the network stack) without merging the packets in the NIC 355, thereby reducing the delay time.

For example, the processor 120 may reduce the value of napi_weight. The processor 120 may reduce the number of packets fetched from the NIC 355 at the time of one polling by decreasing the value of napi_weight. The processor 120 may reduce the load on the processor 120 by reducing the number of packets fetched from the NIC 355. The processor 120 may shorten the packet processing time and may increase scheduling opportunities for the packet processing by reducing the number of packets fetched from the NIC 355, thereby enabling parallel packet processing.

For example, the processor 120 may reduce the value of netdev_max_backlog. The processor 120 may reduce the number of packets inserted into the backlog queue by decreasing the value of netdev_max_backlog. Since the time during which the packet resides in the backlog queue is also reduced along with a reduction in the value of napi_weight, the processor 120 may reduce the number of packets inserted into the backlog queue, thereby preventing memory resource shortage and increasing the packet time.

For example, the processor 120 may reduce the value of netdev_budget. The processor 120 may decrease the value of netdev_budget according to the decrease of the value of napi_weight. The processor 120 may reduce the value of netdev_budget to quickly process packets in small units that are not merged, thereby reducing the delay time.

For example, the processor 120 may reduce the value of TCP/UDP_mem. Since the average size of data transmitted and received by the URLLC service is small, the processor 120 may secure the resources of the memory allocated to the socket buffer by decreasing the value of TCP/UDP_mem.

In operation 907, the processor 120 may determine whether a predetermined QoS is satisfied. The processor 120 may monitor the communication condition while the application is running. For example, when driving an FPS game application, the processor 120 is required to satisfy a maximum delay time (for example, 4 ms) for reflecting a user input in the game application as soon as possible. The processor 120 may monitor the delay time for reflecting the user input in real time while the FPS game application is running. If the communication condition is good, a delay time lower than the maximum delay time of 4 ms can be satisfied. However, if the communication condition deteriorates, a delay time exceeding 4 ms may occur. The processor 120 may determine that the predetermined QoS is not satisfied when a communication delay exceeding 4 ms occurs and may proceed to operation 905. That is, when the QoS is not satisfied in real time, the processor 120 may additionally perform a change in the network parameter for satisfying the QoS. Although the network parameters are set to the value of Table 1 stored in the network parameter storage unit 350, the processor 120 may additionally adjust at least one parameter of deactivating GRO state, decreasing the value of napi_weight, decreasing the value of netdev_budget, decreasing the value of TCP/UDP socket mem, and decreasing the value of netdev_max_backlog in order to satisfy the QoS for the delay time. For example, if the maximum delay time of 4 ms cannot be satisfied due to deterioration of the communication condition, the processor 120 may additionally reduce the value of TCP/UDP_mem. According to various embodiments, if the predetermined QoS is satisfied, the processor 120 may terminate the procedure without additionally adjusting the network parameters.

Figure 10:
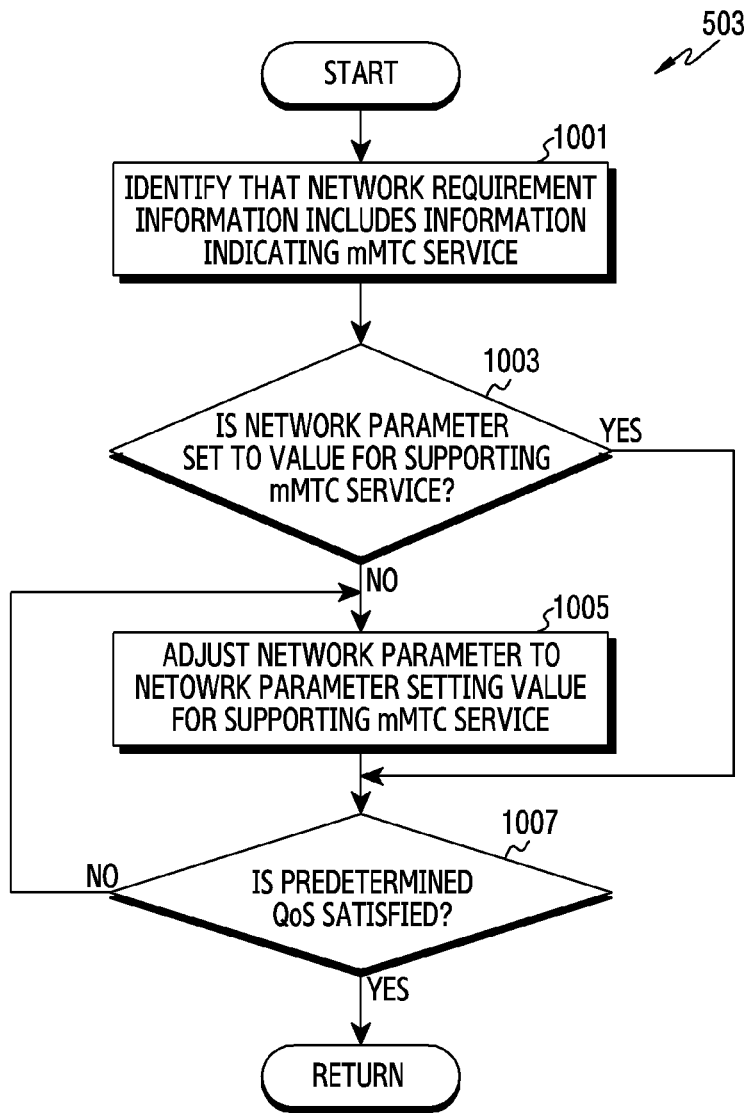
FIG. 10 illustrates a flowchart for adjusting the parameter of an electronic device when a network service category corresponds to a massive machine type communication (mMTC) according to various embodiments of the disclosure.

FIG. 10 illustrates a flowchart for adjusting the parameter of the electronic device 101 when a network service category corresponds to an mMTC service according to various embodiments of the disclosure.

The electronic device of FIG. 10 may correspond to the electronic device 101 shown in FIG. 1. In FIG. 10, the processor 120 of the electronic device 101 may include operations of operation 503 of adjusting at least one parameter based on network requirement information.

In operation 1001, the processor 120 according to various embodiments may identify that the network service category includes information indicating an mMTC service. For example, the processor 120 may explicitly receive information on the network service category from an application. The application may transmit, to the processor 120, information indicating that the network service category requested by the application is the mMTC service. As another example, the processor 120 may non-explicitly receive the information on the network service category from the application. The application may transmit information non-explicitly indicating the network service category based on the operating state of the application The application may transmit information on the type of the application to the processor 120, thereby indirectly indicating the network service category. In the case of an application that transmits and receives a small amount of data intermittently, such as a messenger application (e.g., KakaoTalk, NateOn), the processor 120 may determine to support the mMTC service and may identify that the network service category corresponds to mMTC.

In operation 1003, the processor 120 may determine whether the network parameter is set to a value for supporting the mMTC service. The processor 120 may compare the setting value of the network parameter at the time of receiving the network requirement information with the network parameter setting value for supporting the mMTC service, thereby determining whether the network parameter is required to be adjusted. For example, the electronic device 101 may be requested to execute the messenger application that intermittently performs transmission/reception of a small amount of data while executing an application requesting the URLLC service or the eMBB service. The processor 120 may receive information for representing the messenger application at the time of generating a reception socket for the messenger application or at the time of requesting a session connection. Based on the received network requirement information, the processor 120 may identify that the network service category requested by the messenger application is the mMTC service. The processor 120 may identify the network parameter setting value at the time of generating the reception socket or at the time of requesting the session connection for the messenger application. The processor 120 may request a predetermined network parameter value from the network parameter storage unit 350. In response to the request, the network parameter storage unit 350 may return the network parameter setting value corresponding to the time of generating the reception socket or the time of requesting the session connection. The processor 120 may determine that the returned current network parameter setting value is different from the network parameter setting value for supporting mMTC service, and may perform operation 1005.

As another example, the electronic device 101 may operate as an Internet of things (IoT) device or an TOT gateway device. When the electronic device 101 operates as the IoT device, the electronic device 101 can operate similar to the messenger application. That is, the electronic device 101 may transmit data of a small size intermittently. When the electronic device 101 operates as the TOT gateway device, the electronic device 101 may transmit small-sized data to a plurality of external electronic devices (for example, 100, 000). For example, the electronic device 101 may include an application for providing a smart home service, and may transmit a plurality of pieces of data to the plurality of external electronic devices. According to an embodiment, when the electronic device 101 requests a session connection for the IoT device during execution of the messenger application, the network service category required by the electronic device 101 may be the same as the mMTC service. Thus, the processor 120 may identify that the setting values of the network parameters are the same, and may perform operation 1007.

In operation 1005, the processor 120 may adjust the current network parameter to the network parameter setting value to support the mMTC service. In response to identifying that the current network parameter is not set to a value for supporting the mMTC service, in operation 1003, the processor 120 may request the network parameter setting value for the mMTC service from the network parameter storage unit 350. In response to receiving the request, the network parameter storage unit 350 may transmit the network parameter setting value for supporting the mMTC service of Table 1 above to the processor 120. The processor 120 may identify the network parameter setting value for supporting the mMTC service based on the transmitted setting value, and may adjust the network parameter to the setting value.

According to various embodiments, the processor 120 may perform adjustment of at least one parameter of deactivating the GRO state, increasing the value of TCP/UDP socket_mem, decreasing the value of netdev_budget, and decreasing the value of napi_weight. The processor 120 may generate a plurality of sockets for controlling a plurality of external electronic devices by adjusting the at least one parameter. In various embodiments, the adjustment of the at least one parameter of operation 1007 may be referred to as descriptions of operation 807 and operation 907.

In operation 1007, the processor 120 may determine whether the predetermined QoS is satisfied. In various embodiments, operation 1007 may be referred to as descriptions of operation 807 and operation 907.

Figure 11:
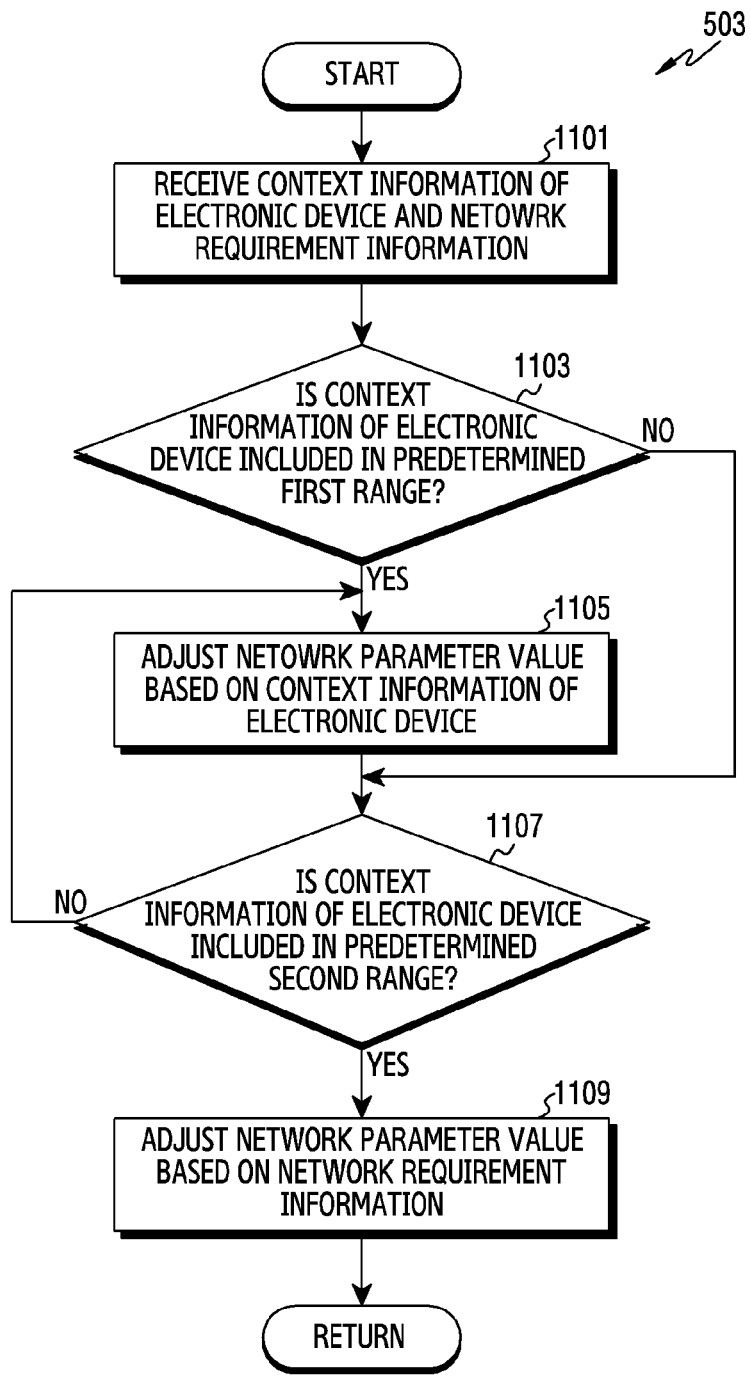
FIG. 11 illustrates a flowchart for adjusting the parameter of an electronic device on the basis of contextual information of an electronic device according to various embodiments of the disclosure.

FIG. 11 illustrates a flowchart for adjusting the parameter of the electronic device 101 on the basis of contextual information of the electronic device 101 according to various embodiments of the disclosure.

The electronic device of FIG. 11 may correspond, for example, to the electronic device 101 shown in FIG. 1. In FIG. 11, the processor 120 of the electronic device 101 may include operations of operation 503 of adjusting at least one parameter based on network requirement information.

In operation 1101, the processor 120 according to various embodiments may receive context information of the electronic device 101 and the network requirement information. The context information of the electronic device 101 may include information on at least one of the internal temperature of the electronic device 101 and the remaining amount of a battery. For example, the processor 120 may acquire sensor data on the internal temperature of the electronic device 101 from a temperature sensor (not shown) included in the sensor module 176 shown in FIG. 1. In another example, the processor 120 may acquire information on the remaining amount of the battery of the electronic device 101 from the power management module 188 or the battery 189 shown in FIG. 1.

According to an embodiment, the processor 120 may receive the network requirement information that explicitly indicates the network service category from the application. Alternatively, the processor 120 may receive information non-explicitly indicating the network service category, based on the operating state of the application. The information non-explicitly indicating the network service category may be based on the operating state of the application.

According to another embodiment, the processor 120 may fail to receive the information non-explicitly indicating the network service category and the information explicitly indicating the network service category for a predetermined time from the time of requesting the session connection for the application or the time of generating a transmission/reception socket for the application. The processor 120 may be set to acquire the context information of the electronic device 101 when the processor 120 fails to receive the information indicating the network service category for a predetermined time from the time of generating the transmission/reception socket or the time of requesting the session connection.

In operation 1103, the processor 120 may determine whether the context information of the electronic device 101 is included in a predetermined first range. The processor 120 may determine whether at least one of the internal temperature of the electronic device 101 and the remaining amount of the battery is included in the predetermined first range. The predetermined first range may refer to a range that can affect the operation of the electronic device 101. For example, the predetermined first range for the internal temperature may include a temperature (e.g., 90 degrees or higher) that can cause malfunction of the electronic device 101. As another example, the predetermined first range for the remaining amount of the battery may include an amount of the battery (e.g., the remaining amount of the battery is 5% or less) in a case in which the sustainable driving time of the electronic device 101 is significantly short. According to various embodiments, the processor 120 may perform operation 1105 when the internal temperature of the electronic device 101 is included in the predetermined first range or when the remaining amount of the battery of the electronic device 101 is included in the predetermined first range. According to various embodiments, the processor 120 may perform operation 1107 when the internal temperature of the electronic device 101 is not included in the predetermined first range and when the remaining amount of the battery of the electronic device 101 is not included in the predetermined first range.

In operation 1105, the processor 120 may adjust the network parameter value based on the context information of the electronic device 101. For example, when the internal temperature of the electronic device 101 is included in the predetermined first range (e.g., 90 degrees or higher), or when the remaining amount of the battery of the electronic device 101 is included in the predetermined first range (e.g., 5% or less), the processor 120 may adjust the network parameter based on the context information of the electronic device 101 without adjusting the network parameter according to the received network requirement information. For example, the processor 120 may not adjust the network parameters to the network parameter setting value for supporting the eMBB service with excessive heat generation even though the network requirement information includes the information indicating the eMBB service. The processor 120 may adjust the network parameters based on the network parameter setting value for supporting the mMTC service with low heat generation in order to lower the internal temperature. In another example, the processor 120 may not adjust the network parameters to the network parameter setting value for supporting the eMBB service with high power consumption, even though the network requirement information includes the information indicating the eMBB service. The processor 120 may adjust the network parameters based on the network parameter setting value for supporting the mMTC service with low power consumption since the remaining amount of the battery power is not large. For example, the processor 120 may perform a change in at least one parameter of deactivating the GRO state, decreasing the value of napi_weight, decreasing the value of netdev_budget, decreasing the value of TCP/UDP socket_mem, and decreasing the value of netdev_max_backlog. The change in the at least one parameter may be referred to as the description of operation 907.

In operation 1107, the processor 120 may determine whether the context information of the electronic device 101 is included in a predetermined second range. The processor 120 may determine whether the internal temperature of the electronic device 101 and the remaining amount of the battery of the electronic device 101 satisfy the predetermined second range. The predetermined second range may refer to a range that does not affect the operation of the electronic device 101 even if the network parameter is changed according to the network service category. For example, the predetermined second range for the internal temperature may include a sufficiently low temperature (for example, 30 degrees or lower) in consideration of heat generation that may occur due to a change in the network parameter. For another example, the predetermined second range for the remaining amount of the battery may include a large remaining amount (e.g., the remaining amount of the battery is 50% or more) of the battery that can drive the electronic device 101 for a predetermined time in consideration of rapid power consumption that may occur due to the change in the network parameter. According to various embodiments, the processor 120 may perform operation 1109 when the internal temperature of the electronic device 101 is included in the predetermined second range and when the remaining amount of the battery of the electronic device 101 is included in the predetermined second range.

In operation 1109, the processor 120 may adjust the network parameter values based on the network requirement information. When the context information of the electronic device 101 is included in the predetermined second range in operation 1107, it is determined that there is no influence on the driving of the electronic device 101 even though the network parameter value is adjusted, and may perform the change in the at least one parameter. For example, when the internal temperature of the electronic device 101 is included in the predetermined second range (e.g., 60 degrees or lower), or when the remaining amount of the battery of the electronic device 101 is included in the predetermined second range (e.g., 50% or less), the network parameter setting value adjusted to reduce the power consumption of the battery or to reduce the amount of heat generation may be adjusted. For example, the processor 120 may adjust the network parameter values adjusted to support the mMTC service to the network parameter value for supporting the eMBB service indicated by the network requirement information, based on the context information of the electronic device 101. For example, the processor 120 may perform a change in the at least one parameter of activating the GRO state, increasing the value of napi_weight, increasing the value of netdev_budget, increasing the value of TCP/UDP socket mem, and increasing the value of netdev_max_backlog. In various embodiments, the descriptions of activating the GRO state, increasing the value of napi_weight, increasing the value of netdev_budget, increasing the value of TCP/UDP socket mem, and increasing the value of netdev_max_backlog in operation 1109 may be referred to as the description of operation 807.

An electronic device according to various embodiments may include a wireless communication modem; at least one processor configured to be connected to the communication modem; a volatile memory configured to be operatively connected to the processor; and a non-volatile memory configured to store at least one application program and to be operatively connected to the processor. The non-volatile memory may be configured to store, when executed, instructions that cause the processor to transmit and receive first data packets to and from the communication modem and to provide a network device interface including at least one first parameter related to processing of the first data packets, to receive requirement information related to the operation of the application program, and to adjust values of the at least one first parameter based on at least a part of the requirement information, and cause the network device interface to transmit and receive the first data packets using at least some of the adjusted values of the first parameters.

According to various embodiments, the requirement information may include at least one of a requirement related to contents provided through the application program and a wireless communication requirement related to the application program.

According to various embodiments, the instructions may be configured to receive the requirement information when the application program is installed in the electronic device or when the application program is executed.

According to various embodiments, the at least one first parameter may include a parameter related to at least one of the number of data packets processed by the network device interface for a selected time and whether the data packets are merged.

According to various embodiments, the electronic device may include a Linux system as an operating system, and the at least one first parameter may be configured to include at least one of parameters related to napi_weight, netdev_max_backlog, and generic receive offload (GRO) of the network device interface provided by the Linux system.

According to various embodiments, the instructions may be configured to cause the processor to transmit and receive second data packets between the application program and the network device interface, to further provide a protocol stack including at least one second parameter related to processing of the second data packets, and to adjust values of the at least one second parameter based on at least a part of the requirement information, and cause the protocol stack to transmit and receive the second data packets using at least some of the adjusted values of the second parameters.

According to various embodiments, the at least one second parameter may include a parameter related to the number of data packets processed by the protocol stack for a selected time.

According to various embodiments, the electronic device may include a Linux system as an operating system, and the at least one second parameter may include netdev_budget of the protocol stack provided by the Linux system.

According to various embodiments, the electronic device may include a buffer memory configured to be formed on at least a part of the non-volatile memory and to at least temporarily store the data packets processed by the protocol stack, and the protocol stack may further include a third parameter related to a size of the buffer memory.

According to various embodiments, the instructions may be configured to cause the processor to adjust a value of the third parameter based on at least a part of the requirement information.

According to various embodiments, the electronic device may include a Linux system as an operating system, and the third parameter may include tcp_rmem and/or udp_rmem of the protocol stack provided by the Linux system.

According to various embodiments, the instructions may be configured to cause the processor to acquire context information related to the electronic device.

According to various embodiments, the instructions may be configured to cause the processor to receive the requirement information for a predetermined time from a time point at which the application program is installed in the electronic device or a time point at which the application program is executed, and the context information may be acquired in response to failing to receive the requirement information for the predetermined time.

According to various embodiments, the context information may include at least one of sensor data on an internal temperature of the electronic device and information on a remaining amount of a battery of the electronic device.

According to various embodiments, the instructions may be configured to cause the processor to bypass adjustment of a setting value of the at least one first parameter when the internal temperature of the electronic device is higher than a threshold temperature or when the remaining amount of the battery is lower than a predetermined amount of the battery.

According to various embodiments, the values of the at least one first parameter may be adjusted further based on information for indicating a mode related to session service continuity received from the application program.

According to various embodiments, the at least one first parameter may be adjusted further based on information for indicating whether the electronic device is interlocked with a cloud server.

According to various embodiments, the instructions may be configured to cause the processor to measure a quality of service (QoS) based on the adjusted at least one first parameter.

According to various embodiments, the instructions may be configured to cause the processor to further adjust the values of the at least one first parameter when the measured QoS is smaller than a predetermined QoS.

According to various embodiments, the requirement information may be determined based on a ultra-reliable low latency communication service, an enhanced mobile broadband service, and a massive machine type communication service.

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
    wireless communication modem;
    a processor configured to be connected to the wireless communication modem;
    a volatile memory configured to be operatively connected to the processor; and
    a non-volatile memory operatively connected to the processor and configured to store at least one application program and instructions that, when executed by the processor, cause the processor to:
        control at least one of a transmission or reception of first data packets to and from the wireless communication modem,
        provide a network device interface including at least one first parameter related to processing of the first data packets,
        control to receive requirement information related to an operation of the application program,
        in response to failing to receive the requirement information for a predetermined time, acquire context information related to the electronic device that is transmitting or receiving the first data packets using the application program,
        adjust values of the at least one first parameter based on at least a part of the requirement information indicating a network service category or at least a part of a result of comparing the acquired context information to a threshold, and
        control the network device interface to transmit or receive the first data packets using at least some of the adjusted values of the at least one first parameter.

2. The electronic device of claim 1, wherein the requirement information includes at least one of a requirement related to contents provided through the application program or a wireless communication requirement related to the application program.

3. The electronic device of claim 1, wherein the non-volatile memory stores instructions that, when executed by the processor, cause the processor to control to receive the requirement information based on the application program being installed in the electronic device or based on the application program being executed.

4. The electronic device of claim 1, wherein the at least one first parameter includes a parameter related to at least one of a number of data packets processed by the network device interface for a selected time or whether the data packets are merged.

5. The electronic device of claim 4, further comprising a Linux system as an operating system,
wherein the at least one first parameter is configured to include at least one of parameters related to napi_weight, netdev_max backlog, or generic receive offload (GRO) of the network device interface provided by the Linux system.

6. The electronic device of claim 1, wherein the non-volatile memory stores instructions that, when executed by the processor, cause the processor to:
control at least one of a transmission or reception of second data packets between the application program and the network device interface,
provide a protocol stack including at least one second parameter related to processing of the second data packets,
adjust values of the at least one second parameter based on at least a part of the requirement information, and
control the protocol stack to transmit or receive the second data packets using at least some of the adjusted values of the at least one second parameter.

7. The electronic device of claim 6, wherein the at least one second parameter includes a parameter related to a number of data packets processed by the protocol stack for a selected time.

8. The electronic device of claim 6, further comprising a Linux system as an operating system,
wherein the at least one second parameter includes netdev_budget of the protocol stack provided by the Linux system.

9. The electronic device of claim 6, further comprising a buffer memory configured to be formed on at least a part of the non-volatile memory and to at least temporarily store the second data packets processed by the protocol stack,
wherein the protocol stack further includes a third parameter related to a size of the buffer memory.

10. The electronic device of claim 9, wherein the non-volatile memory stores instructions that, when executed by the processor, cause the processor to adjust a value of the third parameter based on at least a part of the requirement information.

11. The electronic device of claim 10, further comprising a Linux system as an operating system,
wherein the third parameter includes at least one of tcp_rmem or udp_rmem of the protocol stack provided by the Linux system.

12. The electronic device of claim 1, wherein:
the non-volatile memory stores instructions that, when executed by the processor, cause the processor to control to receive the requirement information for the predetermined time from a time point at which the application program is installed in the electronic device or a time point at which the application program is executed.

13. The electronic device of claim 1, wherein the context information includes at least one of sensor data on an internal temperature of the electronic device or information on a remaining amount of a battery of the electronic device.

14. The electronic device of claim 13, wherein the non-volatile memory stores instructions that, when executed by the processor, cause the processor to bypass adjustment of a setting value of the at least one first parameter when the internal temperature of the electronic device is higher than a threshold temperature or when the remaining amount of the battery is lower than a predetermined amount of the battery.

15. The electronic device of claim 1, wherein the values of the at least one first parameter are adjusted further based on information for indicating a mode related to session service continuity received from the application program.

16. The electronic device of claim 1, wherein the at least one first parameter is adjusted further based on information for indicating whether the electronic device is interlocked with a cloud server.

17. The electronic device of claim 1, wherein the non-volatile memory stores instructions that, when executed by the processor, cause the processor to measure a quality of service (QoS) based on the adjusted values of the at least one first parameter.

18. The electronic device of claim 17, wherein the non-volatile memory stores instructions that, when executed by the processor, cause the processor to further adjust the values of the at least one first parameter based on the measured QoS being smaller than a predetermined QoS.

19. The electronic device of claim 1, wherein the requirement information is determined based on a ultra-reliable low latency communication service, an enhanced mobile broadband service, and a massive machine type communication service.

\* \* \* \* \*